US010856297B2

(12) United States Patent
Chen

(10) Patent No.: US 10,856,297 B2
(45) Date of Patent: Dec. 1, 2020

(54) PRE-CALCULATION OF SUB-EVENT RF CHANNEL

(71) Applicant: Arm Limited, Cambridge (GB)

(72) Inventor: Jiawei Chen, San Diego, CA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/270,961

(22) Filed: Feb. 8, 2019

(65) Prior Publication Data

US 2020/0260448 A1  Aug. 13, 2020

(51) Int. Cl.
*H04W 72/04* (2009.01)
*H04W 84/12* (2009.01)

(52) U.S. Cl.
CPC ........ *H04W 72/0453* (2013.01); *H04W 84/12* (2013.01)

(58) Field of Classification Search
None
See application file for complete search history.

(56) References Cited

U.S. PATENT DOCUMENTS

| 9,798,530 | B2 | 10/2017 | Hillyard |
| 2017/0026905 | A1* | 1/2017 | Denboer ................. H04W 4/70 |
| 2019/0045304 | A1 | 2/2019 | Bhalla et al. |

* cited by examiner

*Primary Examiner* — Anh Ngoc M Nguyen
(74) *Attorney, Agent, or Firm* — Leveque IP Law, P.C.

(57) ABSTRACT

A method, system and computer program product for pre-calculating an RF channel for a short-range, wireless communications low-energy protocol in a connected isochronous stream (CIS) such as, for example BLE, between a master wireless communications device and a slave wireless communication device is disclosed. The method includes calculating an RF channel between the master wireless communications device and the slave wireless communications device for a first sub-event among a plurality of events, where the first sub-event occurs at a first time in the CIS. An RF channel for a subsequent sub-event among the plurality of events is pre-calculated while calculating the RF channel for the first sub-event, where the second sub-event occurs at a second time in the CIS that is subsequent to the first time.

20 Claims, 11 Drawing Sheets

$$\text{SubEventIndex}_{se\_n} = \left( \text{IndexOfLastUsedChannel}_{se\_n} + d + \left\lfloor \text{PrnSubEvent}\_se_{se\_n} \cdot \frac{N - 2d + 1}{2^{16}} \right\rfloor \right) \text{Mod } N$$

Where IndexOfLastUsedChannel is:

$$\text{IndexOfLastUsedChannel}_{se\_n} = \begin{cases} \text{RemappingIndexOfLastUsedChannel} & \text{for } n = 1 \\ \text{SubEventIndex}_{se\_n-1} & \text{for } n > 1 \end{cases}$$

And d is calculated as:

$$d = \max\left( 1, \max\left( \min(3, N-5), \min\left( 11, \left\lfloor \frac{N-10}{2} \right\rfloor \right) \right) \right)$$

FIG. 9

PRE-CALCULATION OF SUB-EVENT RF CHANNEL

BACKGROUND

The present disclosure relates generally to short-range, wireless communications protocol, and more particularly, to an improved Bluetooth® Low Energy (BLE) protocol.

BLE is a wireless personal area network protocol that has a wide array of applications, such as for connecting electronic devices used in, for example, applications such as healthcare, fitness, beacons, home entertainment systems, and the like. Compared to a typical classic Bluetooth® classic device, BLE provides reduced power consumption and incurs lower cost while providing at least a similar, and often greater, communication range between connected devices. BLE radio operates in the unlicensed 2.4 GHz industrial, scientific, and medical radio band (ISM) band. The low-energy (LE) system employs a frequency hopping transceiver to combat interference and fading, and provides a plurality of frequency hopping spread spectrum (FHSS) carriers. LE radio operation utilizes a shaped, binary frequency modulation, to minimize transceiver complexity. LE uses terminology that differs from basic rate/enhanced data rate (BR/EDR) and alternate mac/physical (AMP/PHY) to describe supported PHYs with regard to differences in modulation, applied coding, and the resulting data rates. The mandatory symbol rate is 1 mega symbol per second (Msym/s), where 1 symbol represents 1 bit, consequently supporting a bit rate of 1 megabit per second (Mb/s). This is referred to as the LE 1M PHY. The 1 Msym/s symbol rate may optionally support error correction coding, which is characterized as the LE Coded PHY. This implementation may use either of two coding schemes: S=2, where 2 symbols represent 1 bit and support a bit rate of 500 kb/s, and S=8, where 8 symbols represent 1 bit and support a bit rate of 125 kb/s. An optional symbol rate of 2 Msym/s may also be supported, with a bit rate of 2 Mb/s, which is referred to as the LE 2M PHY. The 2 Msym/s symbol rate supports uncoded data only. LE 1M and LE 2M are collectively referred to as the LE Uncoded PHYs.

LE employs two multiple access schemes: Frequency division multiple access (FDMA) and time division multiple access (TDMA). Forty (40) physical channels, separated by 2 MHz, are used in the FDMA scheme. Three (3) channels are used as primary advertising channels, and 37 are employed as secondary advertising channels, data channels and connected isochronous channels. A TDMA based polling scheme is used in which one device transmits a packet at a predetermined time and a corresponding device responds with a packet after a predetermined interval.

In accordance with the present disclosure, there is provided an improved BLE scheme that pre-calculates radio-frequency (RF) channels for better conformance with Bluetooth® requirements and greater power savings for low-energy streaming activity,

BRIEF DESCRIPTION OF THE DRAWINGS

The present disclosure is illustrated by way of example and not limited in the accompanying figures in which like reference numerals indicate similar elements and in which:

FIG. 9 is a block diagram for sub-event pseudo-random number generation;

DETAILED DESCRIPTION

Figure 1:
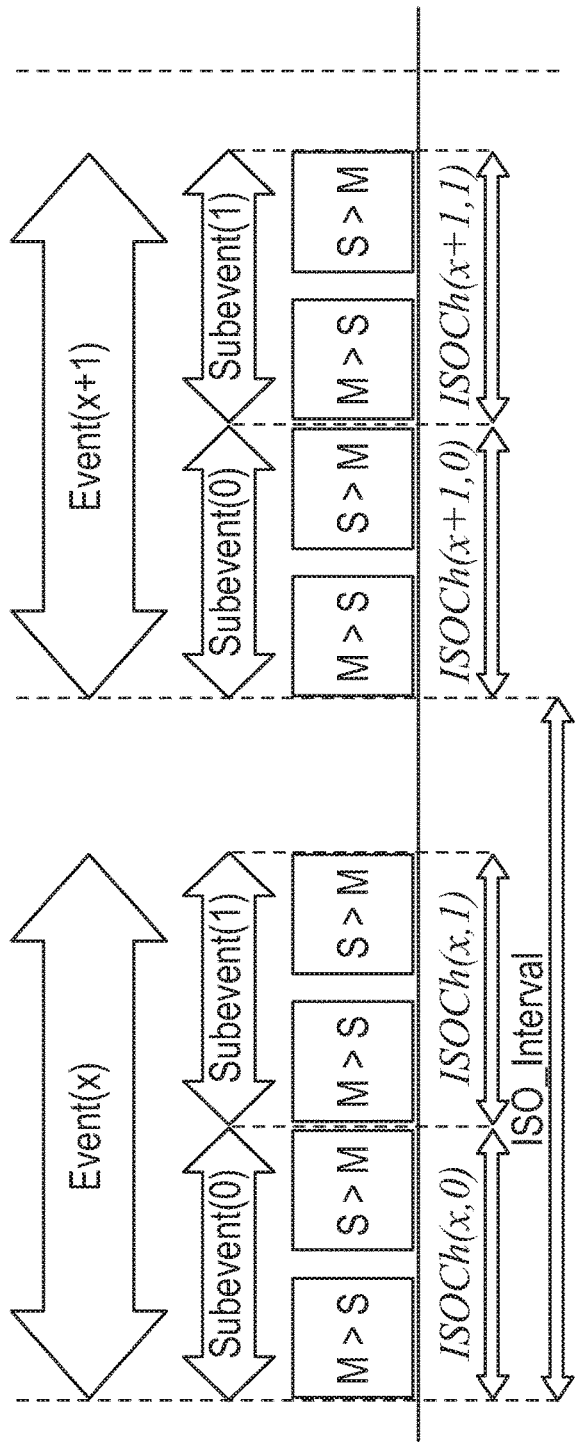
FIG. 1 is a timing diagram of an Asynchronous Connection-Less (ACL) connection, where a master device can establish an isochronous connection that uses the isochronous physical channel.

Specific embodiments of the disclosure will now be described in detail regarding the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more thorough understanding of the disclosure. However, it will be apparent to those skilled in the art that the disclosure may be practiced without these specific details. In other instances, well-known features have not been described in detail to avoid unnecessarily complicating the description.

It is to be understood that the terminology used herein is for the purposes of describing various embodiments in accordance with the present disclosure and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period.

As used herein, the terms "about" or "approximately" apply to all numeric values, irrespective of whether these are explicitly indicated. Such terms generally refer to a range of numbers that one of skill in the art would consider equivalent to the recited values (i.e., having the same function or result). These terms may include numbers that are rounded to the nearest significant figure. In this document, any references to the term "longitudinal" should be understood to mean in a direction corresponding to an elongated direction of a personal computing device from one terminating end to an opposing terminating end.

In accordance with one embodiment of the present disclosure, there is provided a method of pre-calculating an RF channel for a short-range, wireless communications low-energy protocol in a connected isochronous stream (CIS) such as, for example BLE, between a master wireless communications device and a slave wireless communication device. The method includes calculating an RF channel between the master wireless communications device and the slave wireless communications device for a first sub-event among a plurality of events, where the first sub-event occurs at a first time in the CIS. An RF channel for a subsequent sub-event among the plurality of events is pre-calculated while calculating the RF channel for the first sub-event, where the second sub-event occurs at a second time in the CIS that is subsequent to the first time.

In accordance with another embodiment, the start of an event is one or more of a connection event, an isochronous channel event, and a periodic advertising packet between the master wireless communications device and the slave wireless communications device.

In accordance with yet another embodiment, at a start of the event, the method further comprises generating an event channel index, and channel indices for each of a plurality of sub-events among the plurality of events.

In accordance with still another embodiment, the method further includes generating an unmapped event channel selection, passing the unmapped channel to an event mapping to used channel index, generating a sub-event pseudo random number for each sub-event, and generating a sub-event mapping to used channel index.

In accordance with another embodiment, a 6-bit input N is a number of channels characterized as used channels; and a 16-bit input channel-identifier is fixed for one or more of any connection or periodic advertising train, and a 16-bit input counter changes for each event.

In accordance with a further embodiment, the method further includes generating two unsigned pseudo-random numbers prn_e and prn_s; deriving the unmapped channel index from prn_e; deriving sub-event channel selection from prn_s; generating a channel re-mapping table; when an unmapped-channel is a channel index of a used channel according to the table, using the unmapped-channel as the channel index for the event; when an unmapped-channel is a channel index of an unused channel according to the table, then calculating the channel index for the event from prn_e and a number of used channels in accordance with a calculated re-mapping index and channel index based on the remapping index as an index into the re-mapping table; and generating a value of a remapping-index-of-last-used-channel as an index in the remapping table of the channel index for the event for sub-event channel selection.

In accordance with another embodiment, there is provided a system for pre-calculating an RF channel in a short-range, wireless communications low-energy protocol in a CIS between a master wireless communications device and a slave wireless communication device. The system includes one or more processors coupled to non-transitory memory storing machine executable program instructions that when executed by the one or more processors, cause the master wireless communications device and the slave wireless communications devices to: calculate an RF channel between the master wireless communications device and the slave wireless communications device for a first sub-event among a plurality of events, the first sub-event occurring at a first time in the CIS; and pre-calculate an RF channel for a subsequent sub-event among the plurality of events while calculating the RF channel for the first sub-event, the second sub-event occurring at a second time in the CIS, where the second time is subsequent to the first time.

In accordance with still another embodiment, there is provided a computer program product for pre-calculating an RF channel in a short-range, wireless communications low-energy protocol in a CIS between a master wireless communications device and a slave wireless communication device. The computer program product includes a non-transitory memory medium containing machine executable program instructions executable by one or more processors. The program instructions include program code, which when executed by the more or processors, causes the one or more processors to calculate an RF channel between the master wireless communications device and the slave wireless communications device for a first sub-event among a plurality of events, the first sub-event occurring at a first time in the CIS. The program instructions further include program code, which when executed by the more or processors, causes the one or more processors to pre-calculate an RF channel for a subsequent sub-event among the plurality of events while calculating the RF channel for the first sub-event, the second sub-event occurring at a second time in the CIS, where the second time is subsequent to the first time.

BLE defines four LE physical channels, each of which is optimized and utilized for a different purpose. The LE piconet physical channel is used for communication between connected devices and is associated with a specific piconet. The LE advertising physical channel is used for broadcasting advertisements to LE devices. These advertisements can be used to discover, connect, or send user data to scanner or initiator devices. The advertising periodic physical channel is used to send user data to scanner devices in periodic advertisements at a specified interval. The LE isochronous physical channel is used to transfer isochronous data between LE devices in an LE piconet or to transfer isochronous data between unconnected LE devices. Whenever the link layer is synchronized to the timing, frequency, and access address of a physical channel, it is said to be 'connected' on the data physical channel or 'synchronized' to the periodic physical channel or isochronous physical channel (whether or not it is actively involved in communications over the channel).

With reference to FIG. 1, there is shown a timing diagram of an Asynchronous Connection-Less (ACL) connection, where a master device can establish an isochronous connection that uses the isochronous physical channel. An isochronous connection is used to transfer isochronous data between the master device and a slave device using an isochronous connection logical transport referred to as a Connected Isochronous Stream (CIS). A CIS consists of CIS events that occur every isochronous interval. Every CIS event consists of one or more subevents. In each subevent, the master transmits once and the slave responds. If the master and slave have completed transferring the scheduled isochronous data in an isochronous interval, all other subevents in that interval will have no radio transmissions and the event is closed. Each subevent uses an RF channel which is determined using the channel selection algorithm. The RF channel used for a subevent is marked as ISO Ch(eventcounter, subeventcounter).

The LE isochronous physical channel is created for transferring isochronous data between LE devices. The LE isochronous physical channel is characterized by a pseudorandom sequence of PHY channels and by three additional parameters provided by a master device. The first is the channel map that indicates the set of PHY channels used in the piconet. The second is a pseudo random number used as an index into the complete set of PHY channels. The third is the timing of the first data packet. In an isochronous connection, the timing of the first packet is provided in the Link Layer message sent by the master device during the CIS establishment phase in the associated ACL connection. The LE isochronous physical channel is used to send isochronous data in isochronous events that occur at regular intervals. Each isochronous event is divided into one or more subevents. Each subevent corresponds to a different PHY channel. In any subevent, in an isochronous connection the master transmits a packet to a slave device, which may respond with its own packet. The master device controls the access to the LE isochronous physical channel. In every isochronous event, the master device initiates its transmission at the start of the first subevent. Packets transmitted by the master device are time-aligned with the start of every subevent. The LE isochronous physical channel uses the set of PHY channels that are set by the LE piconet physical channel. There are 37 PHY data channels. The master device or the isochronous stream broadcaster can reduce this number through the channel map that indicates the used channels. When the channel selection algorithm selects an unused channel, the unused channel is replaced with an alternate from the set of used channels. The LE isochronous physical channel can use any LE PHY.

Figure 2:
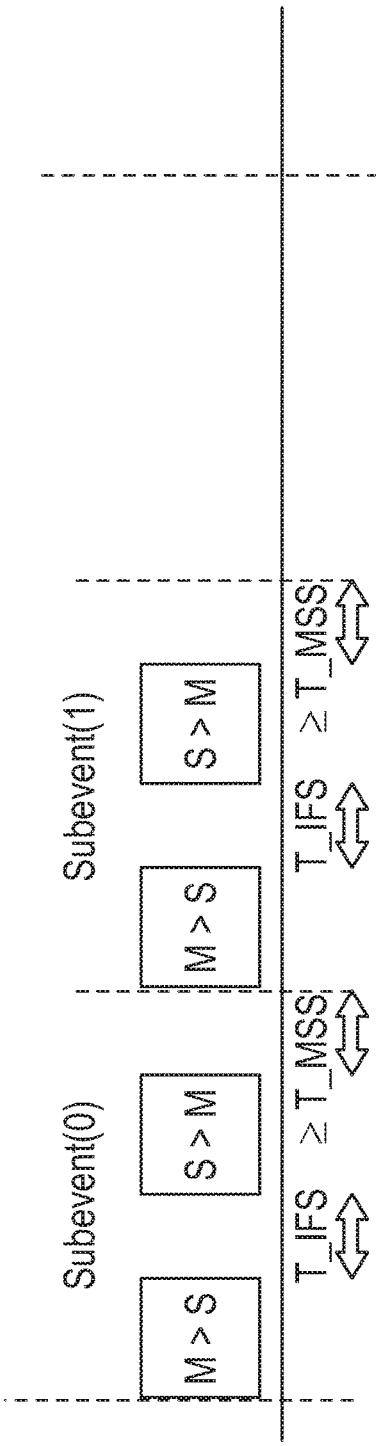
FIG. 2 is a timing diagram depicting the Minimum Subevent Spacing in a Connected Isochronous Stream (CIS)

The minimum time interval between the end of the last bit of the last packet in one subevent and the start of the first bit of the first packet in the next subevent is called the Minimum Subevent Spacing, which is designated "T_MSS" and is 150 µs in accordance with the standard. FIG. 2 is a timing diagram depicting the T_MSS in a CIS.

Figure 3:
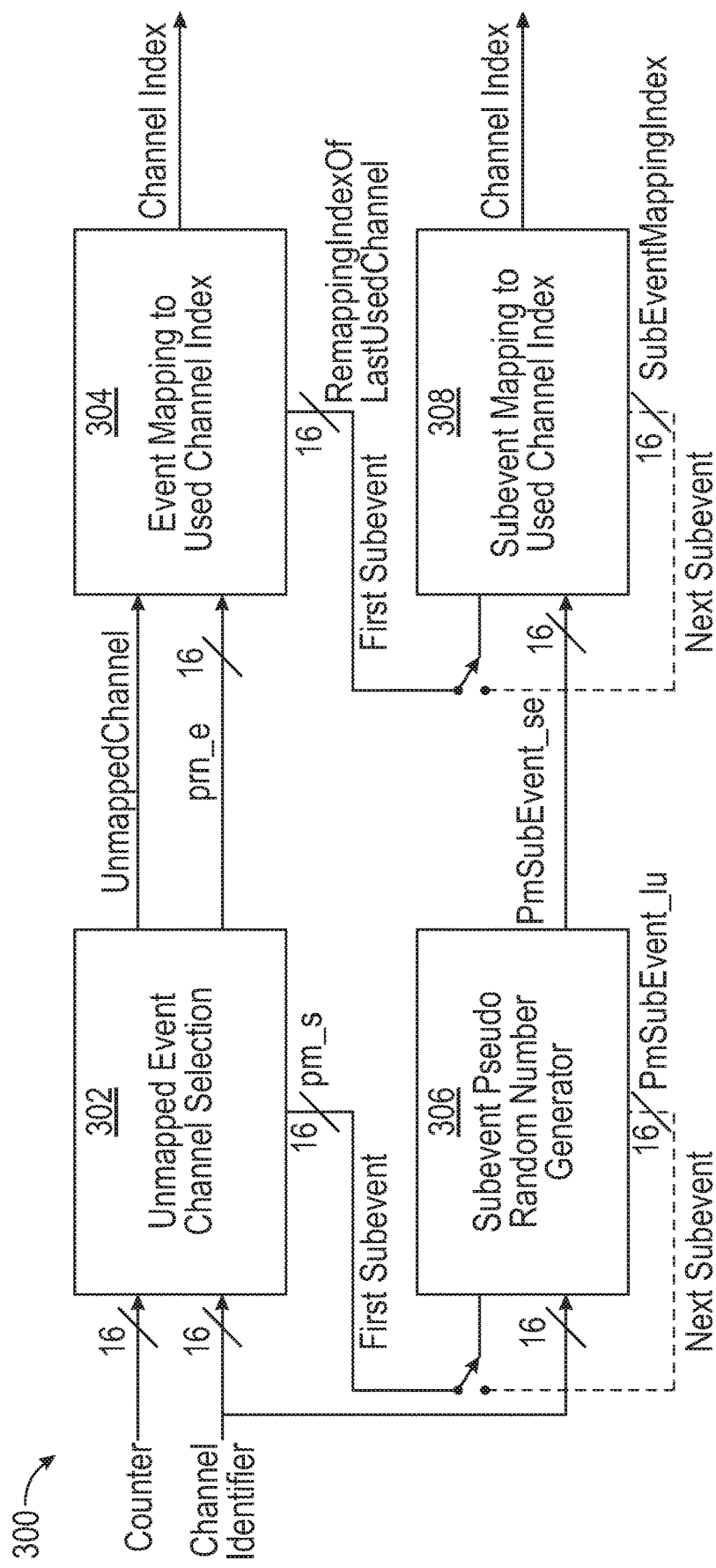
FIG. 3 is a block diagram of a channel selection algorithm.

With reference now to FIG. 3, there is depicted a block diagram of a channel selection algorithm 300 that implements: (1) channel selection for connection events and periodic advertising events, and (2) subevent channel selection. At the start of an event, which can be a connection event, an isochronous channel event, or a periodic advertising packet, the algorithm generates an event channel index (which is a data or periodic physical channel index, as appropriate). If the event contains subevents, it also generates channel indices for each subevent. As shown in FIG. 3, the blocks 302, 304 (Unmapped Event Channel Selection/Event Mapping to Used Channel Index) generates event channel indices and blocks 306/308 (Subevent Pseudo Random Number Generator/Subevent Mapping to Used Channel Index) generates subevent channel indices. In the case where there are no subevents, only the upper blocks 302, 304, are utilized. The first subevent of an isochronous event uses the channel index from the event mapping, and all subsequent subevent(s) in that event uses the channel index from the subevent mapping. The channel selection algorithm 300 receives the following inputs and constituent components:

A 6-bit input N is the number of channels classified as Used channels

A 16-bit input channelIdentifier is fixed for any given connection or periodic advertising train.

The channelIdentifier is calculated from the Access Address by: channelIdentifier=(Access Address31-16) XOR (Access Address 15-0). The 16-bit input counter changes for each event. For isochronous logical transports, this is represented by bits 0 to15 of the event counter. For sub-event channel mapping, the input se_n is the number of the subevent, starting at 1 (0 is used to indicate the initial event).

Figure 4:
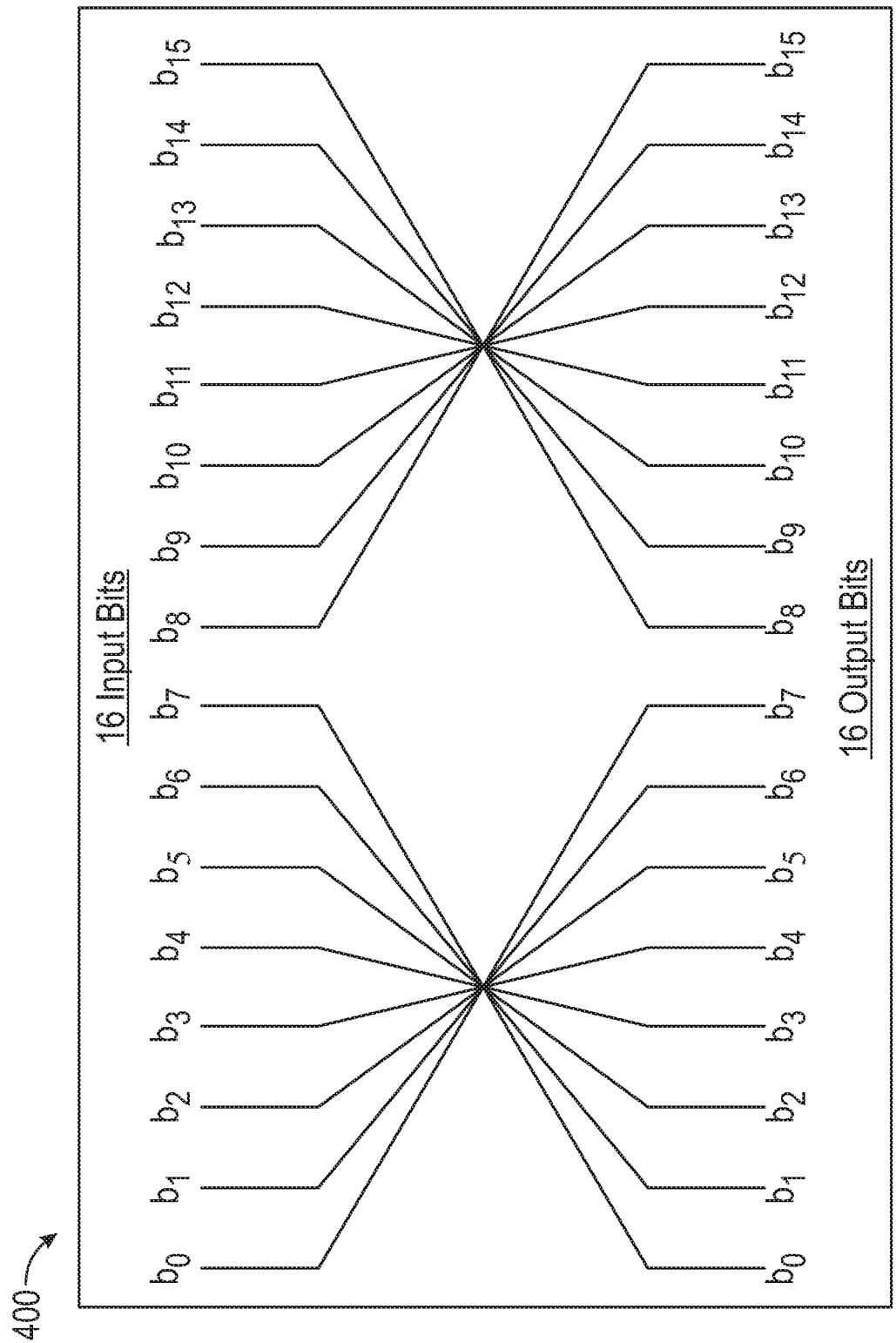
FIG. 4 is a block diagram of a permutation operation.

With reference now to FIG. 4, there is illustrated a diagram of a permutation operation 400 that consists of separately bit-reversing the lower 8 input bits and upper 8 input bits. The "XOR" operation always refers to a 16-bit bit-wise XOR. The symbol [ . . . ] is used to represent the floor function (the greatest integer less than or equal to the argument).

Figure 5:
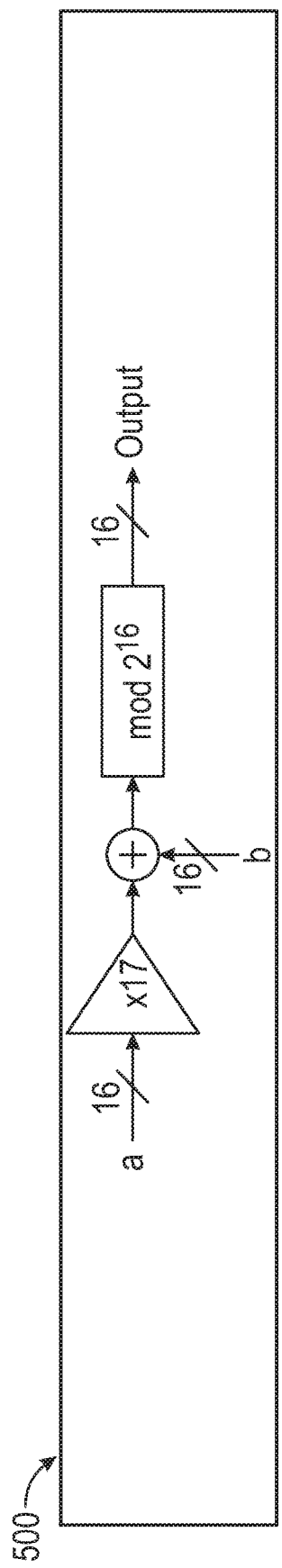
FIG. 5 is a diagram of a Multiply, Add, and Modulo (MAM) block.

Referring now to FIG. 5, there is shown a Multiply, Add, and Modulo (MAM) block 500, that is operable to perform a multiplication operation, an addition operation, and a modulo operation. The output of the MAM operation, given inputs a and b, is:

$$\text{output} = (17 \times a + b) \bmod 2^{16}$$

A remapping table is constructed that contains all the used channels in ascending order and indexed from zero.

Figure 6:
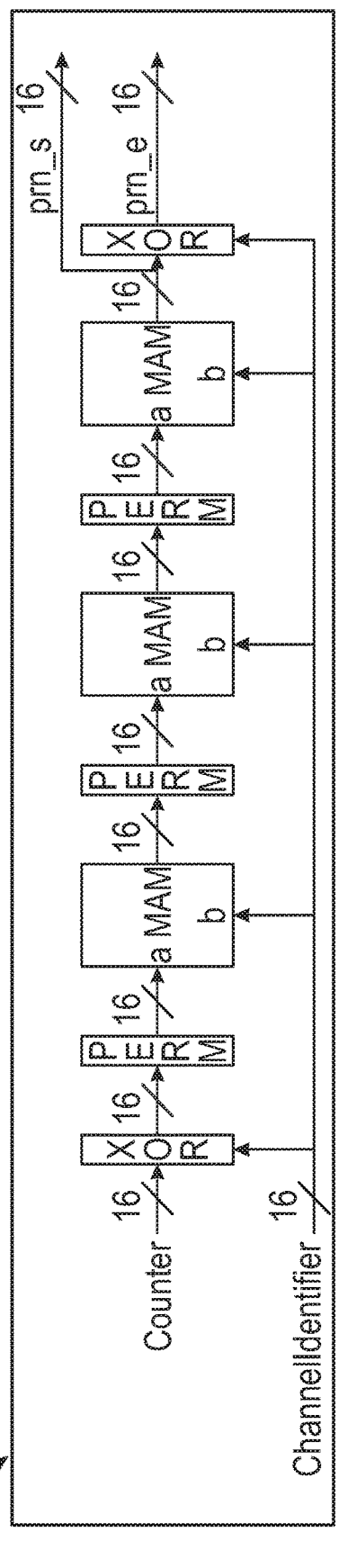
FIG. 6 is a block diagram of a first stage of an unmapped event channel selection process.
Figure 7:
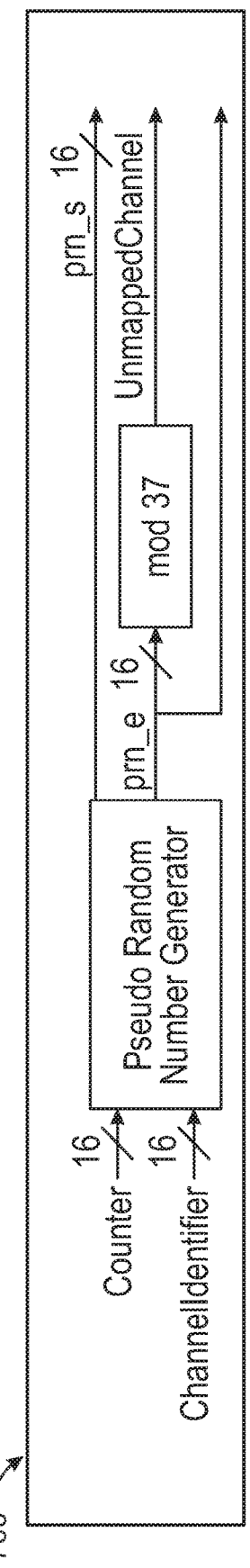
FIG. 7 is a block diagram of a second stage of the unmapped event channel selection process.

The unmapped event channel selection process consists of two stages. In the first stage 600 as illustrated in the block diagram of FIG. 6, two unsigned pseudo-random numbers prn_e and prn_s are generated (prn_s is only used for subevent channel selection), after which the unmapped channel index unmappedChannel is derived from prn_e. The second stage 700 of the unmapped channel selection process is depicted in the block diagram of FIG. 7, where the unmappedChannel is then calculated as prn_e modulo 37.

Figure 8:
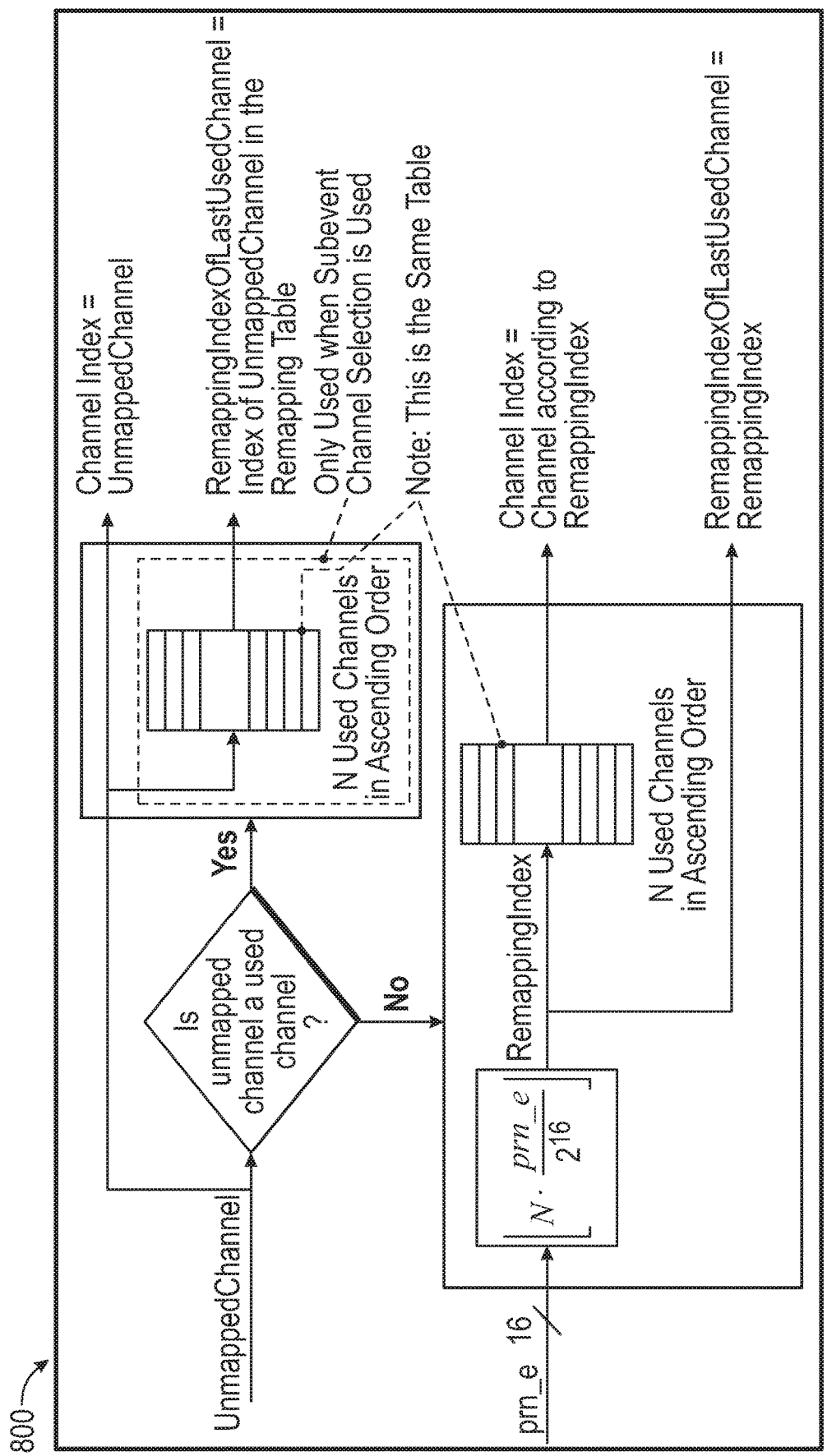
FIG. 8 is a diagram of an event mapping to used channel index process.

FIG. 8 illustrates an event mapping to used channel index process 800. If unmappedChannel is the channel index of a used channel according to the channel map, it is then employed as the channel index for the event. If unmappedChannel is the index of an unused channel according to the channel map, then the channel index for the event is calculated from prn_e and N (the number of used channels) by first calculating the value remappingIndex as:

$$\text{remapping index} = \left\lfloor \left( \frac{N * \text{prn\_e}}{2^{16}} \right) \right\rfloor$$

and then using remappingIndex as an index into the remapping table to obtain the channel index for the event. In either case, the value remappingIndexOfLastUsedChannel is the index in the remapping table of the channel index for the event. This value is only used for subevent channel selection.

Figure 10:
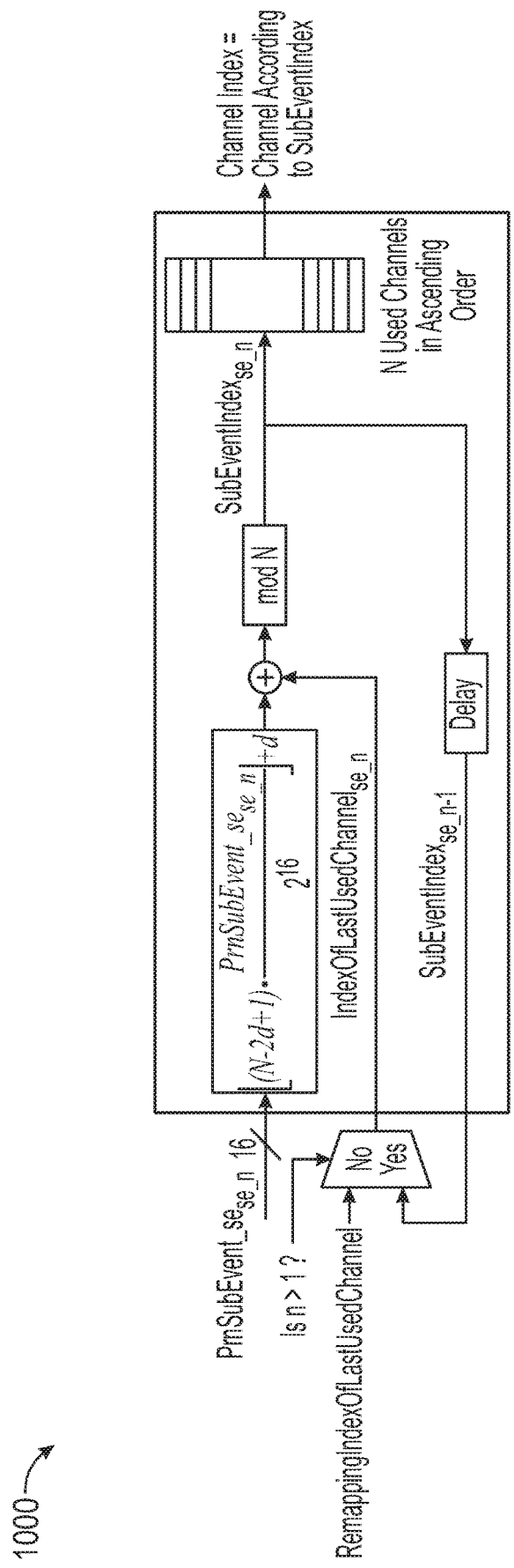
FIG. 10 is a block of a remapping process.

Referring now to FIG. 9, there is depicted a block 900 for sub-event pseudo-random number generation. Subevent pseudo-random number generation involves generating two more pseudo-random numbers prnSubEvent_se and prnSubEvent_lu for each subevent. The value of subEventlndex is then used as an index into the remapping table as depicted in block 1000 of FIG. 10.

A Connected Isochronous Group (CIG) allows a master device to set up one or more isochronous connections for transferring streams of isochronous data. Where more than one CIS exists within a CIG, their isochronous data may have a time correspondence at the application layer. The Link Layer enables synchronization of isochronous data at the application layer. A CIG consists of one or more CISs. The total number of CISs in a CIG is denoted by the parameter NumCIS. Each CIS is identified by the CIS number which represents the position order (i.e. transmission order) of the CIS in a CIG. The value of the CIS number is assigned sequentially in ascending order between 1 and NumCIS in the order in which they are enabled. The CIS_ID is independent of the CIS number. The master Host assigns an identifier denoted by the parameter CIG_ID to each CIG. The CIG_ID is sent to the slave Host through the Link Layer during the establishment of any CIS in the CIG.

A CIG event consists of one or more CIS events depending on the number of CISs in that CIG. CIG events occur periodically every isochronous interval. The CIG event starts at the start of the first subevent of the first scheduled CIS (i.e. CIS(1)) and ends at the end of the last subevent of the last scheduled CIS (i.e. CIS(NumCIS)) in an isochronous interval. The CIG anchor points occur at the same time as the anchor points of the first CIS in the CIG.

Figure 11:
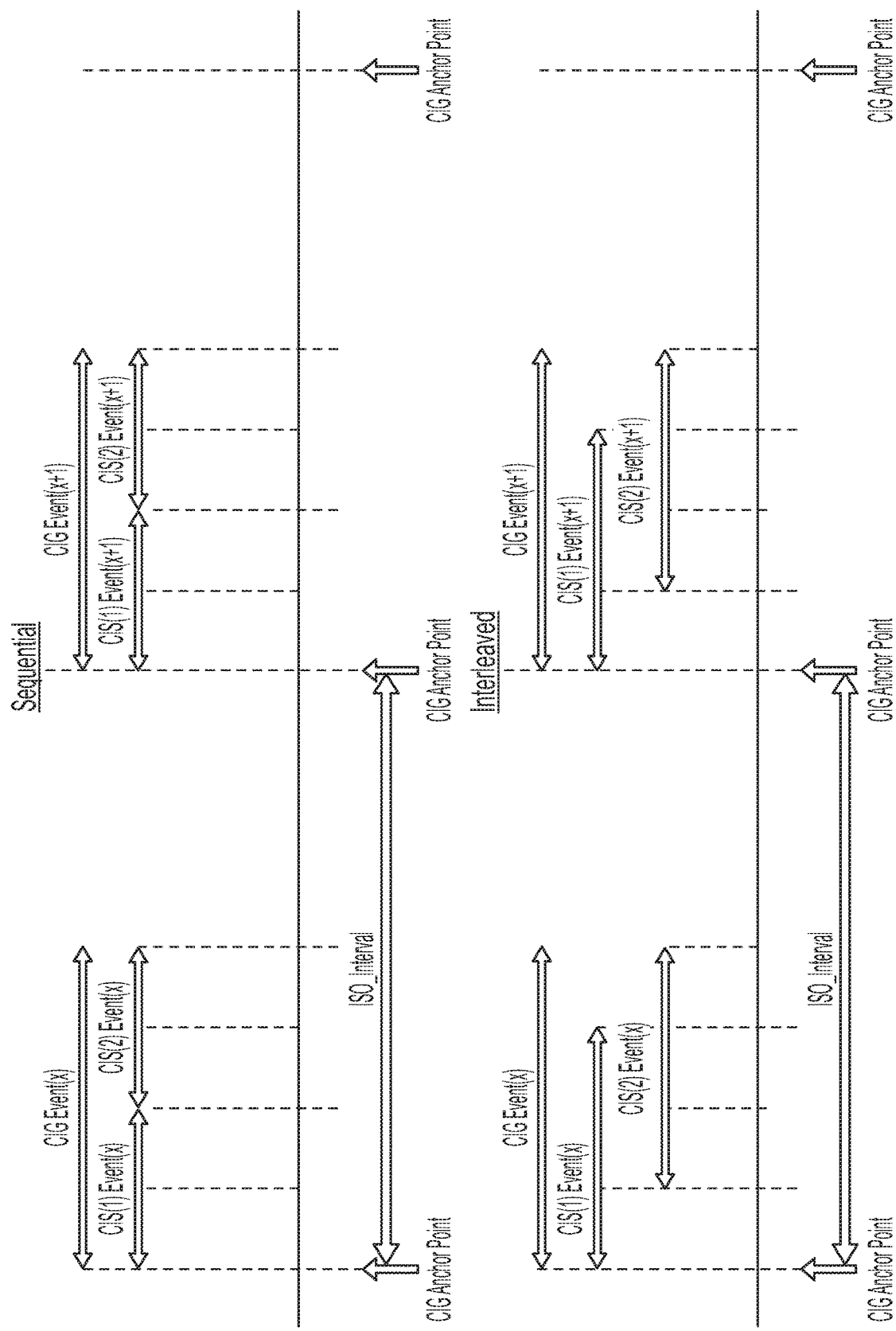
FIG. 11 is a timing diagram depicting interleaved arrangement the CIS events of multiple overlapping CISs.

Multiple CISs in a CIG can be scheduled sequentially or in an interleaved arrangement. In the sequential arrangement, the CIS events are "back to back" which means CIS(2)'s event is immediately after CIS(1)'s event as shown in timing diagram of FIG. 11. In the interleaved arrangement the CIS events of multiple CISs are overlapping as shown in the drawing.

The CIS is a logical transport that enables the transfer of isochronous data between the master device and slave device. The LE-S or LE-F logical links are created when the Host enables a CIS in the controller. The isochronous data can be transferred either in an LE-S or LE-F logical link using the CIS logical transport. The isochronous data packets in the LE-S logical link may be fixed or variable size unframed CIS packet data units (PDUs). The isochronous data packets in the LE-F logical link may be fixed or variable size framed CIS Data PDUs.

A CIS supports variable size packets and transmission of one or more packets (i.e. a burst of packets denoted by the BN parameter) in an isochronous interval, allowing a range of data rates to be supported. Data traffic is unidirectional or bidirectional between a master and a slave. There is an acknowledgment protocol, which improves the reliability of delivering packets in a CIS. A CIS consists of one or more transmission periods denoted as subevents that occur every isochronous interval. To improve the reliability, the isochronous data packets can be re-transmitted by allocating more subevents than the number of packets scheduled to be transmitted in each interval. A CIS also supports a flushing mechanism, which allows a greater amount of time than one isochronous interval to deliver the payload. Every payload in a CIS has a flushing period defined by the fail parameter FT. By increasing the value of the FT, the reliability of delivering packets can be improved at the expense of higher latency.

Figure 12:
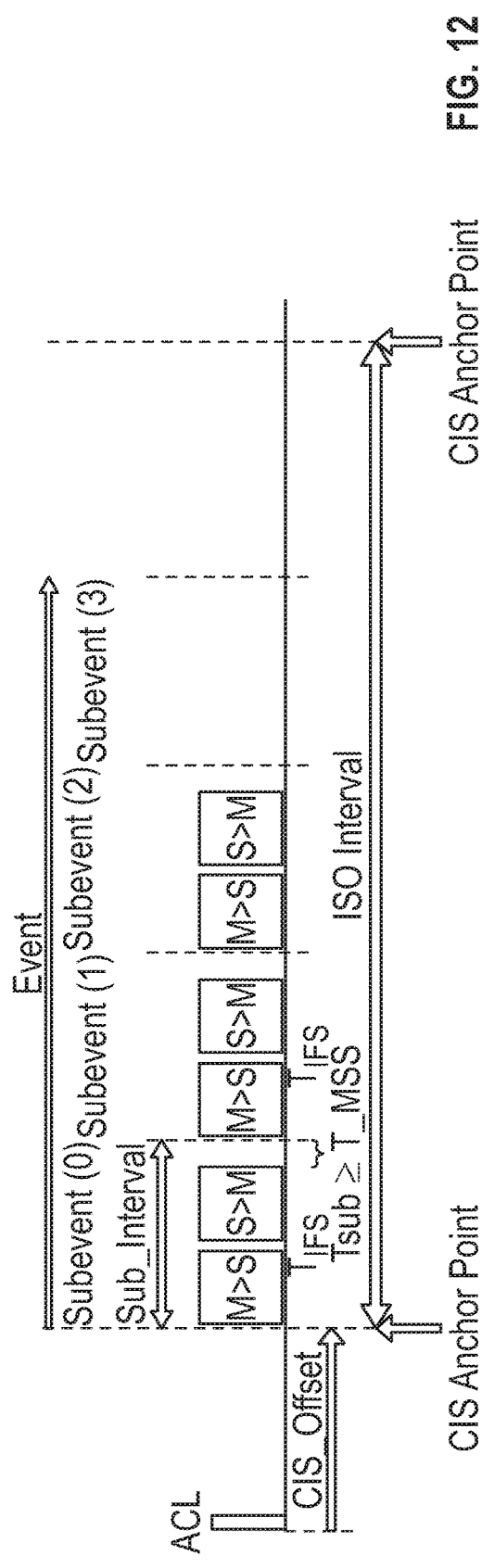
FIG. 12 is a timing diagram illustrating how a subevent is used for transmission of a packet from a master device to a slave device and the response packet from the slave device to the master device.

A subevent is used for transmission of a packet from the master to the slave and the response packet from the slave device to the master device as shown in the timing diagram of FIG. 12. Here, an example CIS with NSE=4 showing CIS_offset, event and subevents is shown. The channel index for subevents is derived using the channel selection algorithm 300 described above and illustrated in FIG. 3. The packet transmitted by the master device or the slave device is a CIS Data PDU or Null PDU. The master device transmits a packet at the CIS anchor point (i.e. in the first subevent). Using the same channel index the slave device may send a packet Time Inter Frame Space (T_IFS) after it receives a packet from the master device, regardless of a valid cyclic redundancy check (CRC) match. The slave device does not transmit if it fails to receive a packet from the master device. The master device and the slave device may use the subsequent subevents for transmission or retransmission of packets. Multiple subevents within an isochronous interval occur every Sub_Interval, which is greater or equal to (Tx time of Max_Payload_Size PDU from master+T_IFS+Tx time of Max_Payload_Size PDU from slave+T_MSS).

Figure 13:
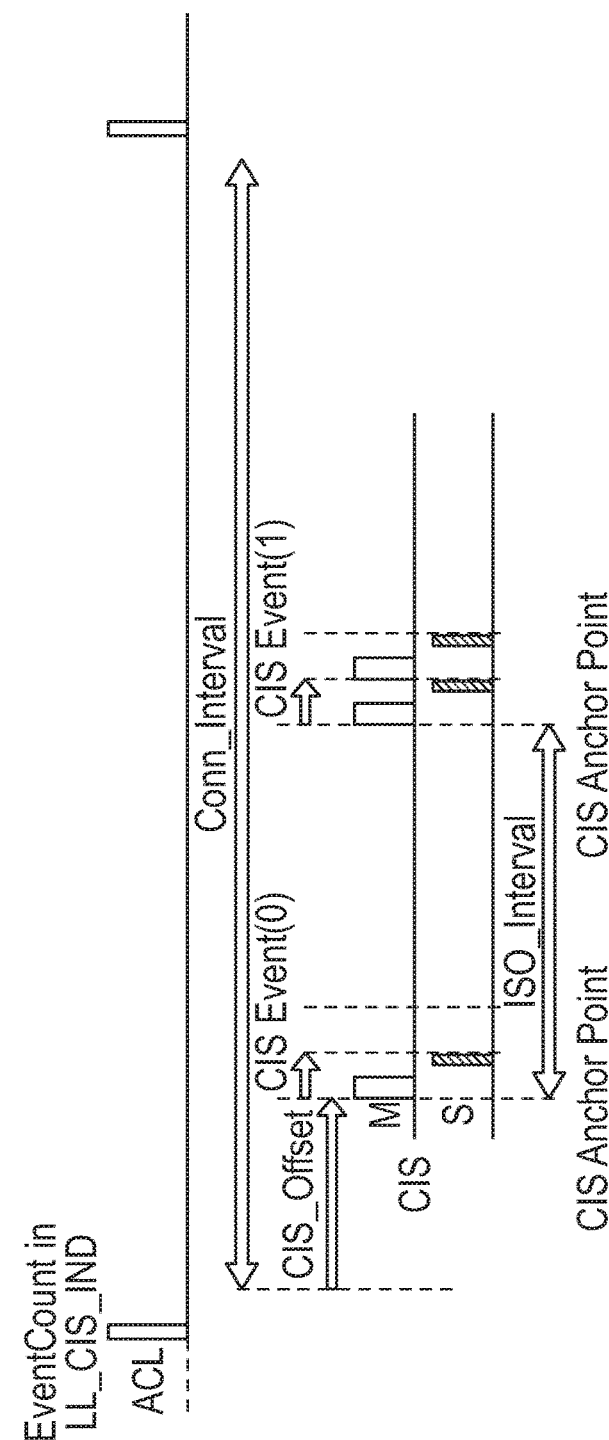
FIG. 13 is a timing diagram depicting a first CIS anchor point referenced in time from a CIS_Offset and eventCount parameters sent in the LL_CIS_PDU sent in the ACL connection

The Link Layer in the Connection state when directed by the Host only transmits CIS PDUs in CIS events. CIS events in turn consist of CIS subevents in which the master and slave transfer CIS PDUs. Each CIS event normally contains at least one CIS PDU sent by the master. The master can, however, completely fail to transmit in a CIS event due to scheduling conflicts but transmits at least one CIS PDU within each CIS supervision timeout period. The start of a CIS event is called a CIS anchor point. The start of CIS events are spaced regularly with an interval ISO_Interval and don't overlap. The ISO_Interval is a multiple of 1.25 ms in the range of 5 ms to 4 s. The ISO_Interval is set by the master during scheduling of the CIS and sent to the slave during the CIS master establishment procedure. The first CIS anchor point is referenced in time from the CIS_Offset and the eventCount parameters sent in the LL_CIS_PDU sent in the ACL connection as shown in FIG. 13.

Figure 14:
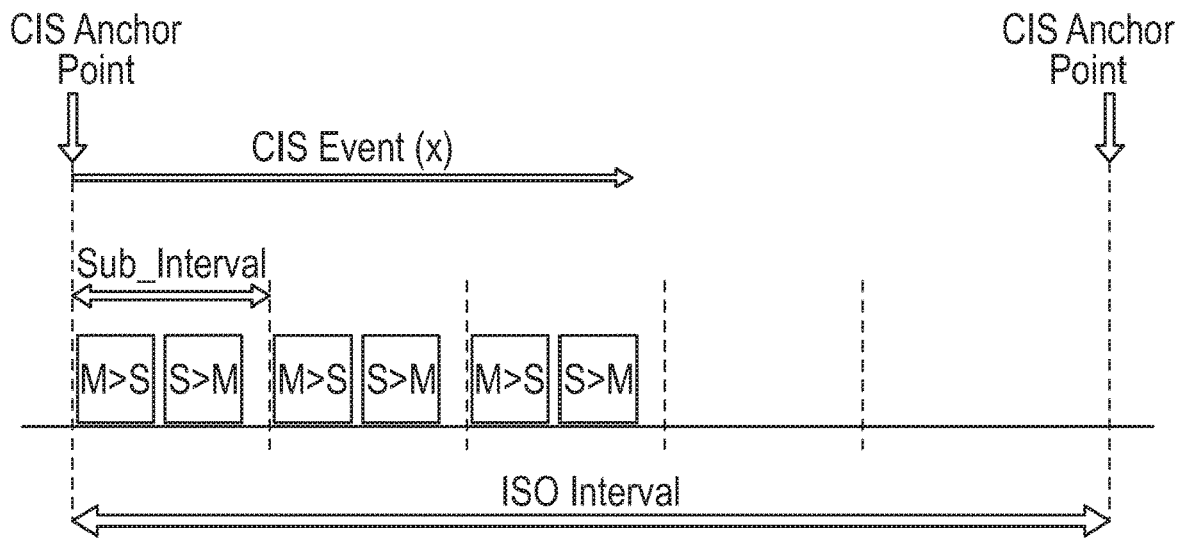
FIG. 14 is a timing diagram of a CIS event with network search engine (NSE)=4

With reference to FIG. 14, there is depicted a timing diagram of a CIS event with NSE=4. Here, the CIS event starts at a CIS anchor point and ends at the end of the last transmission from the slave in the last subevent in an isochronous interval, or earlier when specified using the CIS bit. The CIS event ends when all scheduled payloads are transmitted and the peer successfully acknowledged all the scheduled payloads as shown in the drawing. The minimum duration of a CIS event can be Sub_Interval—(time between packets (TIFS) and the maximum duration can be (NSE*Sub_Interval)—TIFS. The Link Layer schedules BN number of payload PDUs every ISO_Interval.

The Link Layer maintains a 16-bit event counter denoted as cisEventCount which is set to zero in the first CIS event. The cisEventCounter is incremented by one every CIS event. The start of every CIS event (i.e. the first subevent in the ISO_Interval) occurs on a physical channel index which is derived using the cisEventCount in the channel selection algorithm 300 (FIG. 3).

In accordance with embodiment of the disclosure, the timing is improved for the CIS event with multiple subevents. Since the CIS subevents use different RF channels, in order to connect the master and slave devices, they have to agree on the same RF channel, access address and timing of the transmission. The calculation of the first subevent in each CIS event is implemented by the channel selection algorithm 300 (FIG. 3) based on the CIS event counter. For the calculation of the subsequent subevents after the first subevent, the channel selection algorithm 300 calculates the same based on the CIS subevent counter.

Figure 15:
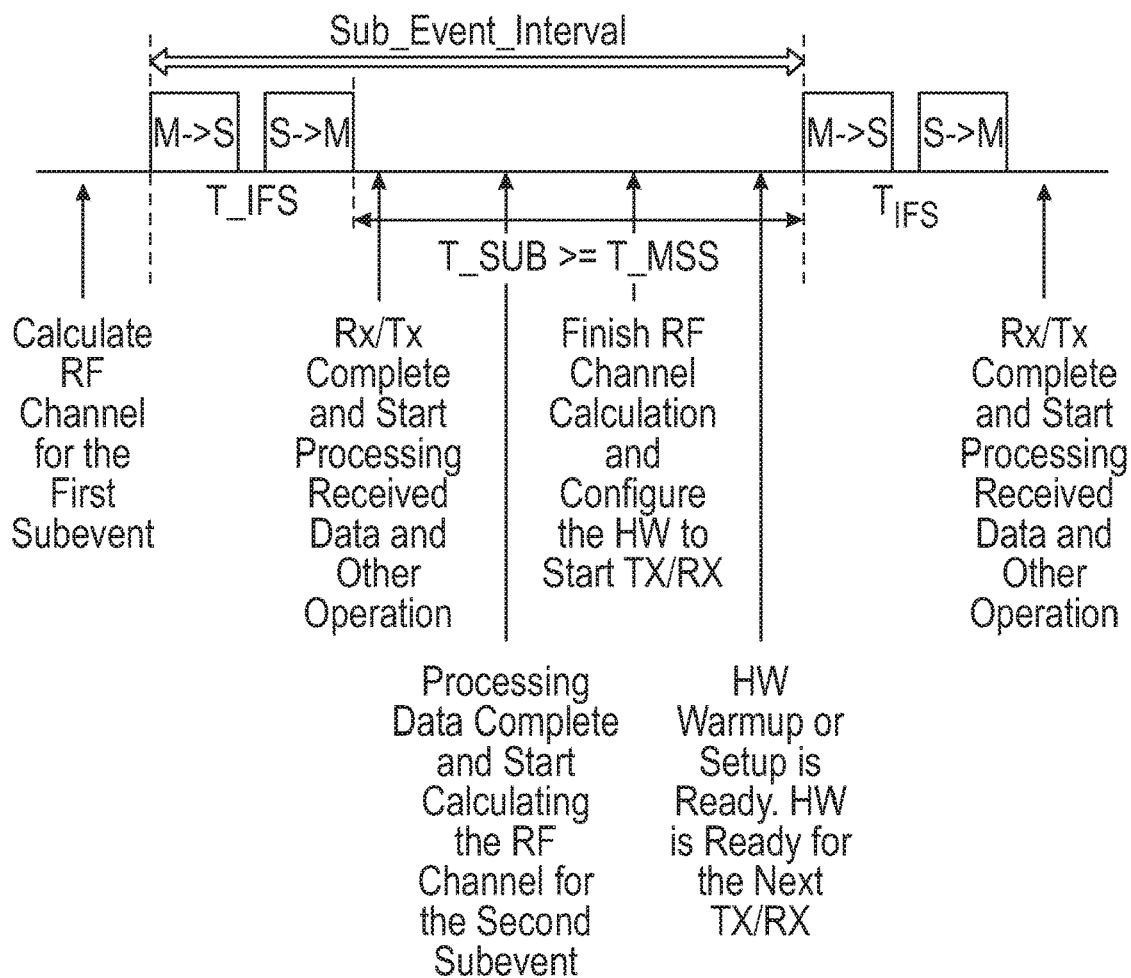
FIG. 15 is a timing diagram of a method in accordance with an embodiment of the disclosure.

Referring now to FIG. 15, there is shown a timing diagram of a method in accordance with an embodiment of the disclosure. As shown, the master device starts transmitting to slave device on the pre-defined RF channel during the first subevent. The RF channel for the first subevent is calculated milliseconds before the first subevent. Then after T_IFS which is 150 microseconds, the slave device responds to the master device on the same RF channel. In this solution, master/slave waits for Tx/Rx to complete. And then master/slave needs to do some processing to determine whether it needs to continue the next operation. The process might take 50 microseconds for example. Then it starts to calculate the RF channel for the next subevent. The calculation may take various time, in this example, we assume it takes 10 microseconds for the whole calculation. Then master/slave configures the hardware for the next Tx/Rx. The hardware warmup or setup time could be 100 microseconds for example. The whole process takes 160 microseconds in this example. According to the Bluetooth® spec, the master device transmits after 150 microseconds and the slave device starts receiving 150 microseconds from the last subevent.

Figure 16:
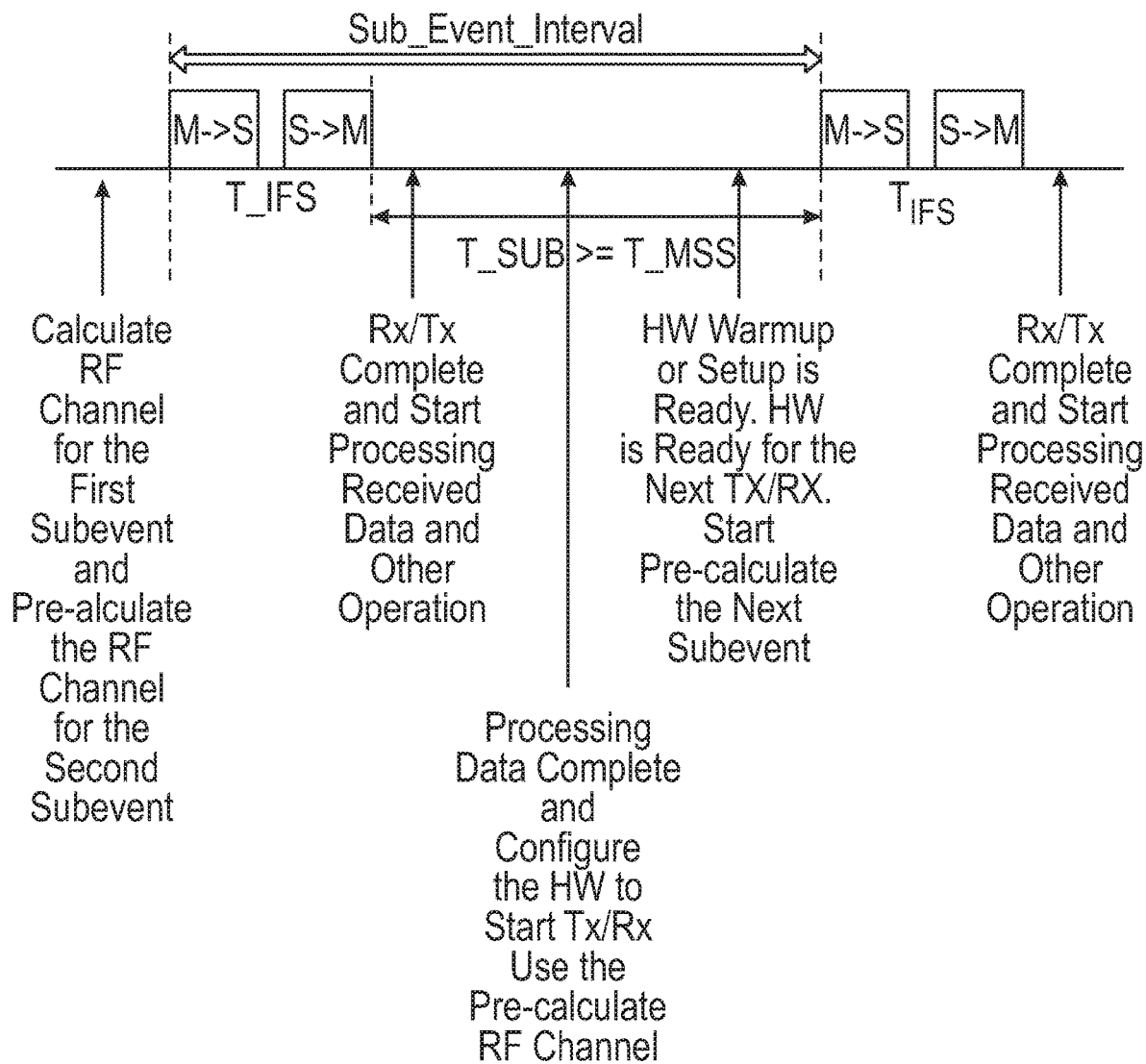
FIG. 16 is a timing diagram of another method in accordance with embodiments of the disclosure.

With reference to FIG. 16, there is depicted a timing diagram of a method in accordance with embodiments of the disclosure where the master device starts transmitting to slave device on the pre-defined RF channel during the first subevent. The RF channel for the first subevent is calculated milliseconds before the first subevent. In this solution, the RF channel for the second subevent is also pre-calculated. Then after T_IFS which is 150 microseconds, slave responds to master on the same RF channel. In this implementation, master/slave needs to wait for Tx/Rx to complete. And then master/slave executes processing to determine whether to continue the next operation. The process might take 50 microseconds, for example. In this arrangement, the master/slave can immediately configure the hardware for the next Tx/Rx operation instead of waiting for the calculation of the next subevent. The hardware warmup or setup time is still 100 microseconds. The whole process can about 150 microseconds. Once the hardware is configured, the next RF channel can be calculated since at this point calculation of next RF channel is not time critical. This is because no hardware operations will take place for a period of time.

The terms "program," "software application," and the like, as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

Some portions of the detailed descriptions, like the processes may be presented in terms of algorithms and symbolic representations of operations on data bits within a computer memory. An algorithm may be generally conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "deriving" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry to perform embodiments of the present disclosure.

Accordingly, embodiments and features of the present disclosure are set out in the following numbered items:

1. A method of pre-calculating an RF channel for a short-range, wireless communications low-energy protocol in a connected isochronous stream (CIS) between a master wireless communications device and a slave wireless communication device, the method including: calculating an RF channel between the master wireless communications device and the slave wireless communications device for a first sub-event among a plurality of events, the first sub-event occurring at a first time in the CIS; and pre-calculating an RF channel for a subsequent sub-event among the plurality of events while calculating the RF channel for the first sub-event, the second sub-event occurring at a second time in the CIS, where the second time is subsequent to the first time.

2. The method of pre-calculating an RF channel of item 1, where the start of an event is one or more of a connection event, an isochronous channel event, and a periodic advertising packet between the master wireless communications device and the slave wireless communications device.

3. The method of pre-calculating an RF channel of item 2, where, at a start of the event, the method further comprises generating an event channel index, and channel indices for each of a plurality of sub-events among the plurality of events.

4. The method of pre-calculating an RF channel of item 1, further including: generating an unmapped event channel selection; passing the unmapped channel to an event mapping to used channel index; generating a sub-event pseudo random number for each sub-event; and generating a sub-event mapping to used channel index.

5. The method of pre-calculating an RF channel of item 4, where: a 6-bit input N is a number of channels characterized as used channels; and a 16-bit input channel-identifier is fixed for one or more of any connection or periodic advertising train, and a 16-bit input counter changes for each event.

6. The method of pre-calculating an RF channel of item 4, further including: generating two unsigned pseudo-random numbers prn_e and prn_s; deriving the unmapped channel index from prn_e; deriving sub-event channel selection from prn_s; generating a channel re-mapping table; when an unmapped-channel is a channel index of a used channel according to the table, using the unmapped-channel as the channel index for the event; when an unmapped-channel is a channel index of an unused channel according to the table, then calculating the channel index for the event from prn_e and a number of used channels in accordance with a calculated re-mapping index and channel index based on the remapping index as an index into the re-mapping table; and generating a value of a remapping-index-of-last-used-channel as an index in the remapping table of the channel index for the event for sub-event channel selection.

7. The method of pre-calculating an RF channel of item 1, where the short-range, wireless communications low-energy protocol is Bluetooth®

8. A system for pre-calculating an RF channel in a short-range, wireless communications low-energy protocol in a connected isochronous stream (CIS) between a master wireless communications device and a slave wireless communication device, the system including: one or more processors coupled to non-transitory memory storing machine executable program instructions that when executed by the one or more processors, cause the master wireless communications device and the slave wireless communications devices to: calculate an RF channel between the master wireless communications device and the slave wireless communications device for a first sub-event among a plurality of events, the first sub-event occurring at a first time in the CIS; and pre-calculate an RF channel for a subsequent sub-event among the plurality of events while calculating the RF channel for the first sub-event, the second sub-event occurring at a second time in the CIS, where the second time is subsequent to the first time.

9. The system for pre-calculating an RF channel of item 8, where the start of an event is one or more of a connection event, an isochronous channel event, and a periodic advertising packet between the master wireless communications device and the slave wireless communications device.

10. The system for pre-calculating an RF channel of item 9, where, at a start of the event, the one more processors are operable to generate an event channel index, and channel indices for each of a plurality of sub-events among the plurality of events.

11. The system for pre-calculating an RF channel of item 9, where the one or more processors are further operable to: generate an unmapped event channel selection; pass the unmapped channel to an event mapping to used channel index; generate a sub-event pseudo random number for each sub-event; and generate a sub-event mapping to used channel index.

12. The system for pre-calculating an RF channel of item 11, where: a 6-bit input N is a number of channels characterized as used channels; and a 16-bit input channel-identifier is fixed for one or more of any connection or periodic advertising train, and a 16-bit input counter changes for each event.

13. The system of pre-calculating an RF channel of item 11, where the one or more processors are further operable to: generate two unsigned pseudo-random numbers prn_e and prn_s; derive the unmapped channel index from prn_e; derive sub-event channel selection from prn_s; generate a channel re-mapping table; when an unmapped-channel is a channel index of a used channel according to the table, use the unmapped-channel as the channel index for the event; when an unmapped-channel is a channel index of an unused channel according to the table, calculate the channel index for the event from prn_e and a number of used channels in accordance with a calculated re-mapping index and channel index based on the remapping index as an index into the re-mapping table; and generate a value of a remapping-index-of-last-used-channel as an index in the remapping table of the channel index for the event for sub-event channel selection.

14. The system for pre-calculating an RF channel of item 8, where the short-range, wireless communications low-energy protocol is Bluetooth®.

15. A computer program product for pre-calculating an RF channel in a short-range, wireless communications low-energy protocol in a connected isochronous stream (CIS) between a master wireless communications device and a slave wireless communication device, the computer program product including: a non-transitory memory medium, the memory medium containing machine executable program instructions executable by one or more processors, the program instructions including: program code, which when executed by the more or processors, causes the one or more processors to calculate an RF channel between the master wireless communications device and the slave wireless communications device for a first sub-event among a plurality of events, the first sub-event occurring at a first time in the CIS; and program code, which when executed by the more or processors, causes the one or more processors to pre-calculate an RF channel for a subsequent sub-event among the plurality of events while calculating the RF channel for the first sub-event, the second sub-event occurring at a second time in the CIS, where the second time is subsequent to the first time.

16. The computer program product for pre-calculating an RF channel of item 15, where the start of an event is one or more of a connection event, an isochronous channel event, and a periodic advertising packet between the master wireless communications device and the slave wireless communications device.

17. The computer program product for pre-calculating an RF channel of item 16, where, at a start of the event, the program code causes the one more processors to generate an event channel index, and channel indices for each of a plurality of sub-events among the plurality of events.

18. The computer program product for pre-calculating an RF channel of item 16, where the program code causes the one or more processors to: generate an unmapped event channel selection; pass the unmapped channel to an event mapping to used channel index; generate a sub-event pseudo random number for each sub-event; and generate a sub-event mapping to used channel index.

19. The computer program code for pre-calculating an RF channel of item 18, where: a 6-bit input N is a number of channels characterized as used channels; and a 16-bit input channel-identifier is fixed for one or more of any connection or periodic advertising train, and a 16-bit input counter changes for each event.

20. The computer program code for pre-calculating an RF channel of item 18, where the program code causes the one or more processors to: generate two unsigned pseudo-random numbers prn_e and prn_s; derive the unmapped channel index from prn_e; derive sub-event channel selection from prn_s; generate a channel re-mapping table; when an unmapped-channel is a channel index of a used channel according to the table, use the unmapped-channel as the channel index for the event; when an unmapped-channel is a channel index of an unused channel according to the table, calculate the channel index for the event from prn_e and a number of used channels in accordance with a calculated re-mapping index and channel index based on the remapping index as an index into the re-mapping table; and generate a value of a remapping-index-of-last-used-channel as an index in the remapping table of the channel index for the event for sub-event channel selection.

In accordance with the foregoing, a method, system and computer program product for pre-calculating an RF channel for a short-range, wireless communications low-energy protocol in a CIS is disclosed. Having thus described the disclosure of the present application in detail and by reference to embodiments thereof, it will be apparent that modifications and variations are possible without departing from the scope defined in the appended claims as follows:

The invention claimed is:

1. A method of pre-calculating an RF channel for a short-range, wireless communications low-energy protocol in a connected isochronous stream (CIS) between a master wireless communications device and a slave wireless communication device, the method comprising:
   calculating an RF channel between the master wireless communications device and the slave wireless communications device for a first sub-event among a plurality of events, the first sub-event occurring at a first time in the CIS; and
   pre-calculating an RF channel for a subsequent sub-event among the plurality of events while calculating the RF channel for the first sub-event, the subsequent sub-event occurring at a second time in the CIS, where the second time is subsequent to the first time.

2. The method of pre-calculating an RF channel of claim 1, where a start of an event is one or more of a connection event, an isochronous channel event, and a periodic advertising packet between the master wireless communications device and the slave wireless communications device.

3. The method of pre-calculating an RF channel of claim 2, where, at the start of the event, the method further comprises generating an event channel index, and channel indices for each of a plurality of sub-events among the plurality of events.

4. The method of pre-calculating an RF channel of claim 1, further comprising:
   generating an unmapped event channel selection;
   passing the unmapped channel to an event mapping to used channel index;
   generating a sub-event pseudo random number for each sub-event; and
   generating a sub-event mapping to used channel index.

5. The method of pre-calculating an RF channel of claim 4, where:
   a 6-bit input N is a number of channels characterized as used channels; and a 16-bit input channel-identifier is fixed for one or more of any connection or periodic advertising train, and a 16-bit input counter changes for each event.

6. The method of pre-calculating an RF channel of claim 4, further comprising:
generating two unsigned pseudo-random numbers prn_e and prn_s;
deriving the unmapped channel index from prn_e;
deriving sub-event channel selection from prn_s;
generating a channel re-mapping table;
when an unmapped-channel is a channel index of a used channel according to the table, using the unmapped-channel as the channel index for the event;
when an unmapped-channel is a channel index of an unused channel according to the table, then calculating the channel index for the event from prn_e and a number of used channels in accordance with a calculated re-mapping index and channel index based on the remapping index as an index into the re-mapping table; and
generating a value of a remapping-index-of-last-used-channel as an index in
the remapping table of the channel index for the event for sub-event channel selection.

7. The method of pre-calculating an RF channel of claim 1, where the short-range, wireless communications low-energy protocol is Bluetooth®.

8. A system for pre-calculating an RF channel in a short-range, wireless communications low-energy protocol in a connected isochronous stream (CIS) between a master wireless communications device and a slave wireless communication device, the system comprising:
one or more processors coupled to non-transitory memory storing machine executable program instructions that when executed by the one or more processors, cause the master wireless communications device and the slave wireless communications devices to:
calculate an RF channel between the master wireless communications device and the slave wireless communications device for a first sub-event among a plurality of events, the first sub-event occurring at a first time in the CIS; and
pre-calculate an RF channel for a subsequent sub-event among the plurality of events while calculating the RF channel for the first sub-event, the subsequent sub-event occurring at a second time in the CIS, where the second time is subsequent to the first time.

9. The system for pre-calculating an RF channel of claim 8, where a start of an event is one or more of a connection event, an isochronous channel event, and a periodic advertising packet between the master wireless communications device and the slave wireless communications device.

10. The system for pre-calculating an RF channel of claim 9, where, at the start of the event, the one or more processors are operable to generate an event channel index, and channel indices for each of a plurality of sub-events among the plurality of events.

11. The system for pre-calculating an RF channel of claim 9, where the one or more processors are further operable to:
generate an unmapped event channel selection;
pass the unmapped channel to an event mapping to used channel index;
generate a sub-event pseudo random number for each sub-event; and
generate a sub-event mapping to used channel index.

12. The system of pre-calculating an RF channel of claim 11, where:

a 6-bit input N is a number of channels characterized as used channels; and
a 16-bit input channel-identifier is fixed for one or more of any connection or periodic advertising train, and a 16-bit input counter changes for each event.

13. The system of pre-calculating an RF channel of claim 11, where the one or more processors are further operable to:
generate two unsigned pseudo-random numbers prn_e and prn_s;
derive the unmapped channel index from prn_e;
derive sub-event channel selection from prn_s;
generating a channel re-mapping table;
when an unmapped-channel is a channel index of a used channel according to the table, use the unmapped-channel as the channel index for the event;
when an unmapped-channel is a channel index of an unused channel according to the table, calculate the channel index for the event from prn_e and a number of used channels in accordance with a calculated re-mapping index and channel index based on the remapping index as an index into the re-mapping table; and
generate a value of a remapping-index-of-last-used-channel as an index in the remapping table of the channel index for the event for sub-event channel selection.

14. The system for pre-calculating an RF channel of claim 8, where the short-range, wireless communications low-energy protocol is Bluetooth®.

15. A computer program product for pre-calculating an RF channel in a short-range, wireless communications low-energy protocol in a connected isochronous stream (CIS) between a master wireless communications device and a slave wireless communication device, the computer program product comprising:
a non-transitory memory medium, the memory medium containing machine executable program instructions executable by one or more processors, the program instructions including:
program code, which when executed by the more or processors, causes the one or more processors to calculate an RF channel between the master wireless communications device and the slave wireless communications device for a first sub-event among a plurality of events, the first sub-event occurring at a first time in the CIS; and
program code, which when executed by the more or processors, causes the one or more processors to pre-calculate an RF channel for a subsequent sub-event among the plurality of events while calculating the RF channel for the first sub-event, the subsequent sub-event occurring at a second time in the CIS, where the second time is subsequent to the first time.

16. The computer program product for pre-calculating an RF channel of claim 15, where a start of an event is one or more of a connection event, an isochronous channel event, and a periodic advertising packet between the master wireless communications device and the slave wireless communications device.

17. The computer program product for pre-calculating an RF channel of claim 16, where, at the start of the event, the program code causes the one or more processors to generate an event channel index, and channel indices for each of a plurality of sub-events among the plurality of events.

18. The computer program product for pre-calculating an RF channel of claim 16, where the program code causes the one or more processors to:
generate an unmapped event channel selection;

pass the unmapped channel to an event mapping to used channel index;
generate a sub-event pseudo random number for each sub-event; and
generate a sub-event mapping to used channel index.

19. The computer program code for pre-calculating an RF channel of claim 18, where:
a 6-bit input N is a number of channels characterized as used channels; and
a 16-bit input channel-identifier is fixed for one or more of any connection or periodic advertising train, and a 16-bit input counter changes for each event.

20. The computer program code for pre-calculating an RF channel of claim 18, where the program code causes the one or more processors to:
generate two unsigned pseudo-random numbers prn_e and prn_s;
derive the unmapped channel index from prn_e;
derive sub-event channel selection from prn_s;
generate a channel re-mapping table;
when an unmapped-channel is a channel index of a used channel according to the table, use the unmapped-channel as the channel index for the event;
when an unmapped-channel is a channel index of an unused channel according to the table, calculate the channel index for the event from prn_e and a number of used channels in accordance with a calculated re-mapping index and channel index based on the remapping index as an index into the re-mapping table; and
generate a value of a remapping-index-of-last-used-channel as an index in the remapping table of the channel index for the event for sub-event channel selection.

* * * * *